United States Patent
Fan et al.

(10) Patent No.: US 11,161,985 B2
(45) Date of Patent: Nov. 2, 2021

(54) METHOD FOR PREPARING BIO-BASED COMPOSITE USING PALM BIOMASS POWDER AS RAW MATERIAL

(71) Applicants: LIAONING XINGFUREN TECHNOLOGY CO., LTD., Liaoning (CN); Yuqin Wang, Liaoning (CN)

(72) Inventors: Dapeng Fan, Liaoning (CN); Haiqun Qi, Liaoning (CN); Yuqin Wang, Liaoning (CN); Gang Feng, Liaoning (CN)

(73) Assignees: LIAONING XINGFUREN TECHNOLOGY CO., LTD., Liaoning (CN); Yuqin Wang, Liaoning (CN)

( * ) Notice: Subject to any disclaimer, the term of this patent is extended or adjusted under 35 U.S.C. 154(b) by 0 days.

(21) Appl. No.: 16/931,256

(22) Filed: Jul. 16, 2020

(65) Prior Publication Data
US 2021/0189135 A1 Jun. 24, 2021

(30) Foreign Application Priority Data
Dec. 24, 2019 (CN) .......................... 201911341714.8

(51) Int. Cl.
C08L 97/02 (2006.01)
B01D 21/28 (2006.01)
(Continued)

(52) U.S. Cl.
CPC .......... *C08L 97/02* (2013.01); *B01D 21/0039* (2013.01); *B01D 21/28* (2013.01);
(Continued)

(58) Field of Classification Search
None
See application file for complete search history.

(56) References Cited

U.S. PATENT DOCUMENTS

2012/0071383 A1* 3/2012 Perez-Prat Vinuesa ..................... C11D 3/382
510/236
2012/0322713 A1* 12/2012 Perez-Prat Vinuesa ..................... C11D 3/2093
510/236

(Continued)

FOREIGN PATENT DOCUMENTS

| CN | 110903673 A | * | 3/2020 | ............. B29B 7/005 |
| ID | 201812186 A | * | 11/2018 | ............. C08K 13/02 |

OTHER PUBLICATIONS

Effect of oil palm shell powder on the mechanical performance and thermal stability of polyester composites O. Nabinejad a, D. Sujan a, M.E. Rahman a, ⇑, Ian J. Davies, Materials and Design 65 (2015) 823-830 (Year: 2015).*

(Continued)

*Primary Examiner* — Peter A Salamon
(74) *Attorney, Agent, or Firm* — MH2 Technology Law Group, LLP

(57) ABSTRACT

A method for preparing a bio-based composite using palm biomass powder as raw material, which belongs to the technical field of preparation methods for bio-based composites. During palm micropowder washing, 100 parts by weight of 600-1,200 mesh palm micropowder is placed in a reactor, and 400-500 parts by weight of acetone is added to the reactor in a 1:4 or 1:5 bath ratio; during surface treatment of palm micropowder, the reaction system after solvent displacement is heated to 80-100° C., and distillate is dehydrated with a 3A molecular sieve and then refluxed to a reactor; bio-based resin is compounded and extruded. At least one embodiment of the present invention solves the problem that use of palm as a biomass raw material leads to impurity migration and insufficient product performance due to high small oily molecule content.

10 Claims, 1 Drawing Sheet

(51) Int. Cl.
  B01D 21/00 (2006.01)
  B29B 7/00 (2006.01)
  B29B 9/10 (2006.01)
  C08L 23/06 (2006.01)
  C08L 23/12 (2006.01)
  C08L 29/04 (2006.01)
  C08L 67/04 (2006.01)
  B29B 9/12 (2006.01)

(52) U.S. Cl.
  CPC .............. B29B 7/005 (2013.01); B29B 9/10 (2013.01); C08L 23/06 (2013.01); C08L 23/12 (2013.01); C08L 29/04 (2013.01); C08L 67/04 (2013.01); B29B 2009/125 (2013.01); C08L 2207/066 (2013.01)

(56) References Cited

U.S. PATENT DOCUMENTS

2013/0029894 A1* 1/2013 Bettiol ................ C11D 3/1253
                                                          510/236
2021/0189135 A1* 6/2021 Fan ...................... B29C 48/022

OTHER PUBLICATIONS

Production of palm frond based wood plastic composite by using twin screw extruder Russita M and Bahruddin IOP Conf. Series: Materials Science and Engineering 345 (2018) 012039 doi:10.1088/1757-899X/345/1/012039 (Year: 2018).*
Google search: palm powder AND composite (Year: 2021).*
Google search: Bio based composite AND palm (Year: 2021).*
Search IP.com: PG Pub search (Year: 2021).*

* cited by examiner

METHOD FOR PREPARING BIO-BASED COMPOSITE USING PALM BIOMASS POWDER AS RAW MATERIAL

CROSS REFERENCE TO RELATED APPLICATIONS

This application claims priority under 35 U.S.C. § 119 to Chinese Patent Application No. 201911341714.8, which was filed on 24 Dec. 2019, the entire contents of which is hereby expressly incorporated by reference in its entirety.

TECHNICAL FIELD

The present invention relates to a method for preparing a bio-based composite using palm biomass powder as raw material, and belongs to the technical field of preparation method of bio-based composite.

BACKGROUND

Petroleum-based resins, such as polyethylene (PE), polypropylene (PP), polystyrene (PS), and polyvinyl chloride (PVC), are important raw materials, which are still essential in production and life so far; due to mass production and large-scale use thereof, there is no surrogate product in the short run. Since there is no substitute, reduced use of petroleum-based resins remains one of the most important development directions in the resin industry in the coming decades. Preparation of a series of resin products, including hyper filling resins, bio-based resins, and bio-based composites, is a major research focus in this direction.

Palm is one of the major cash crops in tropical and subtropical areas. Oil-extracted palm residues, without edible value, are merely discarded or composted, resulting in a serious environmental problem and severe waste of resources. Palm residues (palm tree barks, palm kernel shells, and palm residues) have high fiber content. Biomass micropowders prepared by pulverizing palm residues can be used as fillers of bio-based composites. This not only solves the environmental problem caused by by-products of cash crops and increases incomes from cash crop growth, but also reduces the use of petroleum-based resins and lowers production costs of bio-based composites (bio-based resins). Therefore, palms are of excellent economic significance and social value.

However, compared with other quality bio-based raw materials, such as wood flour and bamboo flour, compounding general resins with palm residues as bio-based raw materials has some disadvantages. Because low molecular oily substances are rich in palm residues, migration of oily substances easily results in insufficient product performance and surface blooming during resin compounding and when using finished products. Meanwhile, high nutrient content in palm residues easily causes bioerosion of finished products so that durability thereof is influenced.

SUMMARY

To solve the aforementioned problem in the prior art, one of the objectives of the present invention is to provide a method for preparing a bio-based composite using palm biomass powder as raw material.

At least one embodiment consistent with the present invention provides the following technical solution:

A method for preparing a bio-based composite using palm biomass powder as raw material is provided, including the following steps:

step 1, palm micropowder washing:

1) placing 100 parts by weight of 600-1,200 mesh palm micropowders in a reactor, adding 400-500 parts by weight of acetone to the reactor in a 1:4 or 1:5 bath ratio, closing the reactor to have a system sealed; heating to 50-60° C., stirring and dispersing for 30 min at 500 rpm, allowing the palm micropowders to stand for sedimentation, slightly compacting solid sedimentates with a pressing plate, withdrawing and recovering supernatant on the pressing plate, recovering acetone solvent by distillation, filtering the remaining turbid solution, and intensively recovering the solvent by distillation; 2) lifting up the pressing plate, adding additional 500 parts by weight of acetone preheated to 50° C. as dispersion medium, stirring and dispersing for 15 min at 500 rpm, allowing the palm micropowders to stand for sedimentation, slightly compacting solid sedimentates with the pressing plate, and withdrawing the supernatant on the pressing plate; and 3) after repeating operations in step 2) 3-4 times, replacing the solvent with cyclohexane and n-octane as dispersion medium so that washing steps are completed;

step 2, surface treatment of palm micropowders:

1) heating the reaction system after solvent displacement to 80-100° C., dehydrating distillate with a 3A molecular sieve and then refluxing to the reactor, conducting sampling inspection until water content is below 0.2-0.5 mg/L in the reaction system of the reactor; dissolving 3 or 5 parts by weight of 1,6-diisocyanatohexane or 5 parts by weight of toluene-2,4-diisocyanate in cyclohexane, adding to the reactor, and reflux-reacting for 30 min; 2) dissolving 5 or 8 parts by weight of 1-hexadecanol or 6 parts by weight of 1-octadecanol in heating n-octane, then adding to the reactor, reflux-reacting for 2 h while heating and stirring, adding 3 parts by weight of acetyl chloride to the reaction system, and drying the distillate with a 4A molecular sieve and CaO; after reflux-reacting for 2 h, stopping stirring, and cooling the reaction system down to 50° C.; and 3) slightly compacting palm biomass sedimentates with the pressing plate, withdrawing supernatant, and replacing the solvent with n-pentane; heating and stirring after solvent replacement, vacuumizing, and distilling all liquid phase from the reactor to obtain washed, surface-treated, and strictly dehydrated dry palm biomass micropowders so that surface treatment steps are completed;

step 3, compounding and extrusion of bio-based resin:

1) adding 50-60 parts by weight of the washed and surface-treated palm micropowders into a plastic high-speed mixer with high air tightness and corrosion prevention, holding the high-speed mixer at 70° C., adding 1 part by weight of epoxy soybean oil, or 2 parts by weight of polypropylene wax (PPW) and 1 part by weight of epoxy soybean oil, or 1 part by weight of epoxy soybean oil and 1 part by weight of polyvinyl alcohol (PVA), mixing for 5 min, heating the high-speed mixer to 95-100° C., and mixing with 0.2 part by weight of maleic anhydride or 0.2 part by weight of itaconic acid for 5 min; 2) adding 40 parts by weight of linear low density polyethylene (LLDPE) resin bounded aggregates, 7 parts by weight of 500 mesh calcium carbonate, 3 parts by weight of 1,800 mesh calcium carbonate, and 3 parts by weight of zinc stearate, or 30 parts by weight of polypropylene (PP) resin bounded aggregates, 5 parts by weight of 500 mesh calcium carbonate, 5 parts by weight of 3,000 mesh calcium carbonate, and 3 parts by weight of calcium stearate, or 40 parts by weight of polylactic acid (PLA) resin bounded aggregates; 3) heating the high-speed mixer to 85-90° C., mixing for 20 min, discharging, and cooling to obtain a degradable masterbatch premix; and 4) compounding and extruding the premix with a two-stage extruder, cooling and pelletizing materials by means of die face pelletizing and air-cooling strand pelletizing processes (to avoid product performance loss due to water absorption during cooling), to obtain palm bio-based/polyethylene (PE) resin masterbatches, so that compounding and extrusion steps are completed.

Various embodiments of the present invention have the following beneficial effects:

1. At least on embodiment of the present invention solves the problem that use of the palm as a biomass raw material leads to impurity migration and insufficient product performance due to high small oily molecule content. 2. At least on embodiment of the present invention breaks away from the misunderstanding that only treating biomass in an aqueous solution leads to a high conversion cost, and creates an effective palm biomass treatment method. 3. A new bio-based resin material with low cost, high performance, excellent processability, and satisfaction of food contact conditions can be prepared by using palm residue as a bio-based material. 4. Use efficiency of palm residues is improved to reduce pressure for environmental protection.

DETAILED DESCRIPTION

Figure 1:
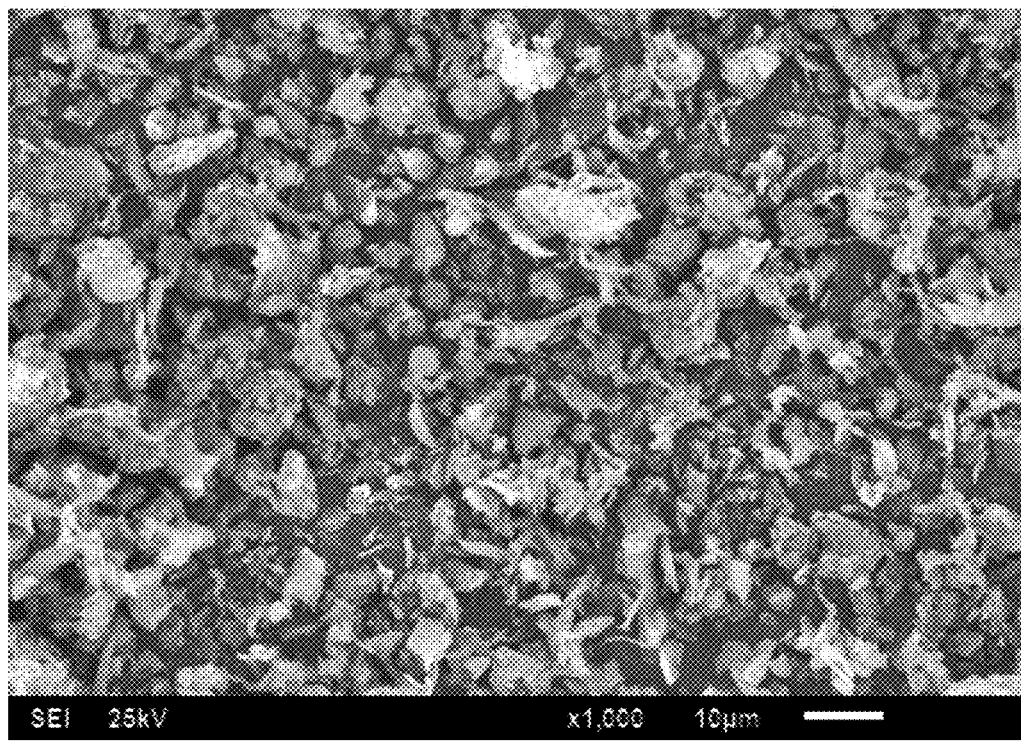
FIG. 1 depicts a scanning electron microphotograph of surface-modified palm micropowders.

Embodiments of the present invention will be further described in detail below: detailed descriptions are provided for the implementation of the technical solution of the present invention according to the specific implementation, but the scope of protection of the invention is not limited in the following examples.

Example 1

Step 1, palm micropowder washing:

In general, biomass micropowder is a relatively inexpensive resin filler, and cost thereof is only 300-800 RMB per ton; when washing biomass micropowder, washing cost is even far higher than the cost of the biomass micropowder per se. For this reason, practitioners in the bio-based material industry do not wash and purify biomass powders ordinarily. However, there are many unfavorable factors for direct use of palm micropowders as biomass filling materials. Excessively high content of protein and oil in palm micropowders readily leads to discoloration, coking, small molecular material migration, and bioerosion, which have serious effects on service performance of finished products of bio-based resins. Inventors believe that those skilled in the art severely misunderstand the biomass washing and surface treatment at present; it is widely believed that water should be used as medium in the biomass washing and surface treatment because water is the cheapest medium. However, biomass per se is strongly hydrophilic and swollen in aqueous solutions, leading to high viscosity of a dispersion system and difficult dispersion; moreover, due to a large surface tension, water will harden biomass raw materials during drying after washing and surface treatment. Moreover, water can react with a plurality of modifiers, restricting biomass surface treatment methods. Because water is relatively inexpensive, wastewater produced during production tends to be discharged directly, further leading to non-ignorable wastewater pollution. However, in the presence of the foregoing drawbacks, water as cleaning medium for biomass is quite not ideal to clean oily pollutants. For this reason, it is widely believed that those skilled in the art would prefer to use more quality raw materials than wash the biomass, so that costs are even lower.

Because organic solvents are far more expensive than water, it is widely accepted that it is technically infeasible to use organic solvents far more expensive than biomass raw materials as cleaning media for biomass. However, the above viewpoint is a misunderstanding. Instead, expensive organic solvents are recycling in use, leading to effective cost control. Even so, the cost of washing palm biomass micropowders with organic solvents is many times higher than the price of palm biomass micropowders per se (approximately 1,000-2,000 RMB per ton); but even so, compared with prices of resins, washed and surface-treated palm micropowders still have a prominent price advantage. Washing (surface treatment) brings some benefits, including substantial improvement of mechanical properties of materials, improvement of manufacturability and stability of processing, elimination of pesticide residues, improvement of safety of finished products, and formation of an excellent interface to further increase the content of biomass in finished products. These benefits are not the effects achieved by replacing high-quality biomass raw materials (e.g., wood flour, bamboo flour, and modified starch). Thus, in general, using organic solvents as media for washing and surface treatment of palm biomass micropowders is technically feasible in fact; moreover, this will not cause such problems as environmental pollution, operating environmental deterioration, and substantial costs soaring. Selection of this technology seems infeasible is just the key to solve practical problems.

In washing steps consistent with embodiments of the present invention, using acetone as washing solvent, palm biomass powders are washed repeatedly for a longer time while heating and stirring in order to wash away acetone extracts from the biomass, e.g., pesticide residues, oils and fats, phospholipids, and proteins. During and after washing, extracts are isolated from the palm biomass by withdrawal of supernatant and solvent replacement. Solvent replacement is used, instead of filtration, because filtration is less efficient for mass production and is difficult to ensure airtightness during operation, so as to lead to consumption of organic solvents.

Step 2, surface treatment of palm micropowders:

In view of the technique and method provided by embodiments of the present invention, during treatment of palm biomass micropowders, prime costs lie in the consumption of organic solvents and energy consumption during recovery of organic solvents. Compared with costs of these two processing steps, in fact, surface treatment of palm micropowders is relatively inexpensive. Washing the palm biomass with organic solvents, but without surface treatment in the presence of oily media, is actually equivalent to a waste of an excellent reaction environment obtained by costs. Therefore, it is necessary to conduct surface treatment on palm biomass micropowders.

In the process of the specific implementation of the technique and method provided by the present invention, the washing and surface treatment of palm biomass micropowders are conducted together. After palm biomass micropowders are subjected to repeated solvent replacement and washing with organic solvent acetone as cleaning medium, acetone medium is replaced with such aliphatic hydrocarbon organic solvents as cyclohexane and n-octane; after sampling, the effective hydroxyl number of the biomass is determined in accordance with GB 12008.3-89 Palyether polyols-Determination of Hydroxyl Number, a China's standard.

A mixture system in a reactor is heated to boiling; using residual acetone as water-a carrying agent, azeotropic distillation is conducted under stirring; distillate is dried and dehydrated with a 3A molecular sieve, and then refluxed to the reactor. After the dehydration step achieves the desired dehydration effect, a certain amount of diisocyanate is added to the reactor according to a measured effective hydroxyl number of palm biomass micropowders; after reaction for a predetermined period of time, a higher aliphatic alcohol is dissolved in a solvent mixture of cyclohexane, n-octane and acetone and added to the reaction system. Throughout the course of the reaction, biomass surface is first activated by chemical reactions between diisocyanate and hydroxyl groups on the biomass surface, followed by reaction with terminal hydroxyl groups of the higher aliphatic alcohol; nonpolar long aliphatic chains are grafted onto the surface of the palm biomass to replace polar hydroxyl groups. Thus, this lowers the hydrophilicity and surface energy of the palm biomass, increases the affinity of an interface between the palm biomass and a resin matrix, reduces interfacial friction during subsequent extrusion, and helps form a firm interfacial bonding between the palm biomass and the resin matrix. Therefore, bio-based (palm) resin improves finished product performance substantially.

After surface treatment, stirring is stopped to sedimentate the biomass from the reaction system; after solvent replacement with low-boiling organic solvents cyclohexane and pentane, drying is directly conducted in the reactor to obtain dry and anhydrous modified palm biomass micropowders.

FIG. 1 depicts a scanning electron microphotograph of modified palm biomass micropowders. From the figure, modification does not result in severe agglomeration of biomass powders.

Step 3, compounding and extrusion of bio-based resin:

Modified palm biomass micropowders (30 parts by weight to 70 parts by weight), general purpose resin (30 parts by weight to 70 parts by weight), lubricant (0.5 part by weight to 2.5 parts by weight), compatibilizer (0 part by weight to 1.5 parts by weight), and other auxiliaries are mixed well in a resin high speed mixer in a specified ratio; these materials are continuously stirred, dispersed and cooled in a cooling mixer; cooled materials are compounded and extruded by a twin-screw extruder or two-stage extruder, to obtain bio-based resin particles with palm biomass as filler material.

To determine the performance of the bio-based resin, melt index thereof can be adjusted between 0.5 and 20 (by changing grades of general purpose resins), so as to satisfy process requirements for injection molding, calendaring, vacuum forming, and blow molding. When biomass content is 15-30 wt %, the biomass has a tensile strength of 15-20 MPa, which increases greatly compared with that before surface treatment, i.e., the tensile strength increases by more than 30%.

Specifically, the general purpose resin can be one or a composition of more of PE, PP, PVC, PS, polyester, PLA, and poly(butylene adipate-co-terephthalate) (PBAT). The lubricant can be one or a mixture of more of calcium stearate, magnesium stearate, and zinc stearate. Compatibilizers are epoxy vegetable oils, maleic anhydride and derivatives thereof; other auxiliaries can be color masterbatch, degradable auxiliaries, conductivity improver, blowing promoter, etc.

Specific process parameters including extrusion temperature and extrusion pressure depend on the type and content of general purpose resin; extruded materials must be air cooled to protect extruded resin from absorbing water at a higher temperature to lead to a decrease in material performance. Materials after extrusion, cooling and pelletization are packaged in sealed containers for storage, sale, and use.

Example 2

Step 1, palm micropowder washing:

One hundred parts by weight of 600 mesh palm micropowders were placed in a reactor, and 500 parts by weight of acetone was added to the reactor in a 1:5 bath ratio; the reactor was closed to have a system sealed; the reactor was heated to 50° C., palm micropowders were stirred and dispersed for 30 min at 500 rpm, and allowed to stand for sedimentation; solid sedimentates were slightly compacted with a pressing plate, and supernatant on the pressing plate was withdrawn and recovered; a large amount of acetone solvent was recovered by distillation; after filtering the remaining turbid solution, the solvent was intensively recovered by distillation. The pressing plate was lifted up; additional 500 parts by weight of acetone preheated to 50° C. was added as dispersion medium; palm micropowders were stirred and dispersed for 15 min at 500 rpm, and allowed to stand for sedimentation; solid sedimentates were slightly compacted with the pressing plate, and the supernatant on the pressing plate was withdrawn. After repeating these operations thrice, the solvent was replaced with cyclohexane and n-octane as dispersion medium in the same manner, so that washing steps of the process were completed.

Step 2, surface treatment of palm micropowders:

The reaction system after solvent displacement was heated to 100° C.; distillate was dehydrated with a 3A molecular sieve and then refluxed to the reactor; sampling inspection was conducted until water content was below 0.5 mg/L in the reaction system of the reactor; 3 parts by weight of 1,6-diisocyanatohexane was dissolved in cyclohexane, added to the reactor, and reflux-reacted for 30 min. Five parts by weight of 1-hexadecanol was dissolved in heating n-octane, then added to the reactor, and reflux-reacted for 2 h while heating and stirring; an appropriate amount of acetyl chloride was then added to the reaction system, and the distillate was dried with a 4A molecular sieve and CaO; after reflux-reacting for 2 h, stirring was stopped, and the reaction system was cooled down to 50° C. Palm biomass sedimentates were slightly compacted with the pressing plate; supernatant was withdrawn, and the solvent was replaced with n-pentane; after solvent replacement, the supernatant was heated, stirred, and vacuumized; all liquid phase was distilled from the reactor to obtain washed, surface-treated, and strictly dehydrated dry palm biomass micropowders. At this point, the second step of the process was completed. After measurement, the surface energy of modified biomass powders dropped from 0.047 $J \cdot m^{-2}$ to 0.039 $J \cdot m^{-2}$; modified biomass powders showed a significant change in hydrophilicity and a prominent increase in compatibility with resin matrix. (The surface energy of PE is 0.031 $J \cdot m^{-2}$)

Step 3, compounding and extrusion of bio-based resin:

Fifty parts by weight of the washed and surface-treated palm micropowders were added into a plastic high-speed mixer with high air tightness and corrosion prevention, and the high-speed mixer was held at 70° C.; 1 part by weight of epoxy soybean oil was added to the high-speed mixer and mixed for 5 min; the high-speed mixer was heated to 95-100° C., and 0.2 part by weight of maleic anhydride was added and mixed for 5 min. Forty parts by weight of LLDPE resin bounded aggregates, 7 parts by weight of 500 mesh calcium carbonate, 3 parts by weight of 1,800 mesh calcium carbonate, and 3 parts by weight of zinc stearate were added. The high-speed mixer was heated to 85° C. to mix for 20 min; after discharging, the high-speed mixer was cooled to obtain a degradable masterbatch premix. The premix was compounded and extruded by a two-stage extruder, materials were cooled and pelletized by means of die face pelletizing and air-cooling strand pelletizing processes (to avoid product performance loss due to water absorption during cooling), to obtain palm bio-based/PE resin masterbatches. At this point, the whole process was completed.

Example 3

Step 1, palm micropowder washing:

One hundred parts by weight of 800 mesh palm micropowders were placed in a reactor, and 400 parts by weight of acetone was added to the reactor in a 1:4 bath ratio; the reactor was closed to have a system sealed; the reactor was heated to 60° C., palm micropowders were stirred and dispersed for 30 min at 500 rpm, and allowed to stand for sedimentation; solid sedimentates were slightly compacted with a pressing plate, and supernatant on the pressing plate was withdrawn and recovered; a large amount of acetone solvent was recovered by distillation; after filtering the remaining turbid solution, the solvent was intensively recovered by distillation. The pressing plate was lifted up; additional 500 parts by weight of acetone preheated to 50° C. was added as dispersion medium; palm micropowders were stirred and dispersed for 15 min at 500 rpm, and allowed to stand for sedimentation; solid sedimentates were slightly compacted with the pressing plate, and the supernatant on the pressing plate was withdrawn. After repeating these operations four times, the solvent was replaced with cyclohexane as dispersion medium in the same manner, so that washing steps of the process were completed.

Figure 2:
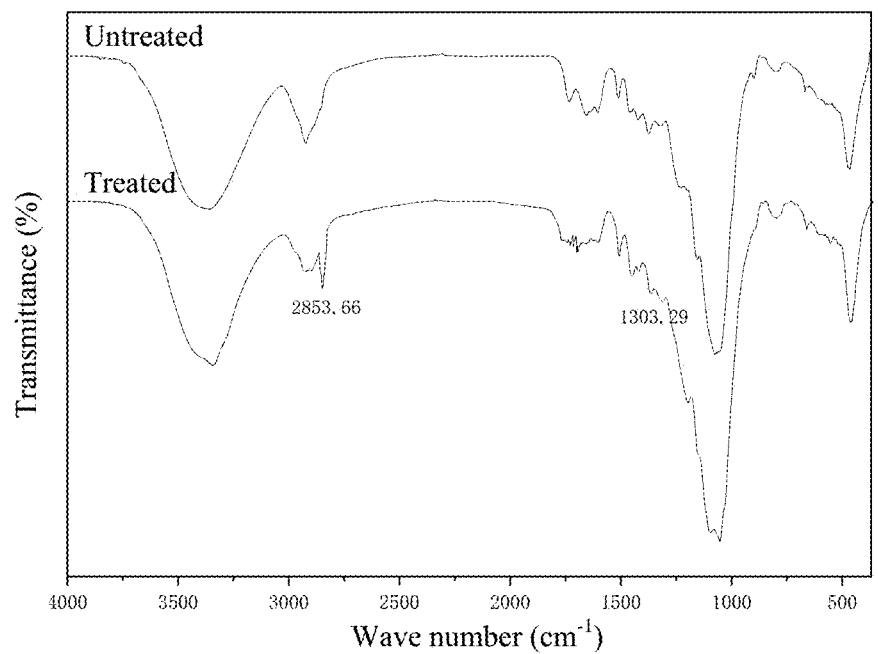
FIG. 2 is an infrared spectrum of palm micropowders before and after surface modification.

Step 2, surface treatment of palm micropowders:

The reaction system after solvent displacement was heated to 80° C.; distillate was dehydrated with a 3A molecular sieve and then refluxed to the reactor; sampling inspection was conducted until water content was below 0.5 mg/L in the reaction system of the reactor; 5 parts by weight of 1,6-diisocyanatohexane was dissolved in cyclohexane, added to the reactor, and reflux-reacted for 30 min. Eight parts by weight of 1-hexadecanol was dissolved in heating n-octane, then added to the reactor, and reflux-reacted for 2 h while heating and stirring; 3 parts by weight of acetyl chloride was then added to the reaction system, and the distillate was dried with a 4A molecular sieve and CaO; reflux reaction continued until no HCl product was distilled off; after heating, stirring, and vacuumizing, all liquid phase was distilled from the reactor to obtain washed, surface-treated, and strictly dehydrated dry palm biomass micropowders. At this point, the second step of the process was completed. An infrared spectrum of the biomass powder before and after surface treatment was detected, as shown in FIG. 2. From the figure, the treated biomass shows stretching vibration of methylene group at 2853 $cm^{-1}$ and twisting vibration of long aliphatic chains at 1300 $cm^{-1}$; background spectrum was complicated, but emergence of these two characteristic peaks can demonstrate that surface modification indeed introduces long aliphatic chains on the biomass surface.

Step 3, compounding and extrusion of bio-based resin:

Sixty parts by weight of the washed and surface-treated palm micropowders were added into a plastic high-speed mixer with high air tightness and corrosion prevention, and the high-speed mixer was held at 70° C.; 2 parts by weight of PPW and 1 part by weight of epoxy soybean oil were added to the high-speed mixer and mixed for 5 min; the high-speed mixer was heated to 95-100° C., and 0.2 part by weight of maleic anhydride was added and mixed for 5 min. Thirty parts by weight of PP resin bounded aggregates, 5 parts by weight of 500 mesh calcium carbonate, 5 parts by weight of 3,000 mesh calcium carbonate, and 3 parts by weight of calcium stearate were added. The high-speed mixer was heated to 90° C. to mix for 20 min; after discharging, the high-speed mixer was cooled to obtain a degradable masterbatch premix. The premix was compounded and extruded by a two-stage extruder, materials were cooled and pelletized by means of die face pelletizing and air-cooling strand pelletizing processes (to avoid product performance loss due to water absorption during cooling), to obtain palm bio-based/PP resin masterbatches. At this point, the whole process was completed.

Example 4

Step 1, palm micropowder washing:

One hundred parts by weight of 1,200 mesh palm micropowders were placed in a reactor, and 500 parts by weight of acetone was added to the reactor in a 1:5 bath ratio; the reactor was closed to have a system sealed; the reactor was heated to 50° C., palm micropowders were stirred and dispersed for 30 min at 500 rpm, and allowed to stand for sedimentation; solid sedimentates were slightly compacted with a pressing plate, and supernatant on the pressing plate was withdrawn and recovered; a large amount of acetone solvent was recovered by distillation; after filtering the remaining turbid solution, the solvent was intensively recovered by distillation. The pressing plate was lifted up; additional 500 parts by weight of acetone preheated to 50° C. was added as dispersion medium; palm micropowders were stirred and dispersed for 15 min at 500 rpm, and allowed to stand for sedimentation; solid sedimentates were slightly compacted with the pressing plate, and the supernatant on the pressing plate was withdrawn. After repeating these operations thrice, the solvent was replaced with n-octane as dispersion medium in the same manner, so that washing steps of the process were completed.

Step 2, surface treatment of palm micropowders:

The reaction system after solvent displacement was heated to 110° C. (an approximate amount of cyclohexane was added to adjust the boiling point of the system); distillate was dehydrated with a 3A molecular sieve and then refluxed to the reactor; sampling inspection was conducted until water content was below 0.2 mg/L in the reaction system of the reactor; 5 parts by weight of toluene-2,4-diisocyanate was dissolved in n-octane, added to the reactor, and reflux-reacted for 30 min. Six parts by weight of 1-octadecanol was dissolved in heating n-octane, then added to the reactor, and reflux-reacted for 2 h while heating and stirring; an appropriate amount of acetyl chloride was then added to the reaction system, and the distillate was dried with a 4A molecular sieve and CaO; after reflux-reacting for 2 h, stirring was stopped, and the reaction system was cooled down to 50° C. Palm biomass sedimentates were slightly compacted with the pressing plate; supernatant was withdrawn, and the solvent was replaced with n-pentane; after solvent replacement, the supernatant was heated, stirred, and vacuumized; all liquid phase was distilled from the reactor to obtain washed, surface-treated, and strictly dehydrated dry palm biomass micropowders. At this point, the second step of the process was completed.

Step 3, compounding and extrusion of bio-based resin:

Fifty-five parts by weight of the washed and surface-treated palm micropowders were added into a plastic high-speed mixer with high air tightness and corrosion prevention, and the high-speed mixer was held at 70° C.; 1 part by weight of epoxy soybean oil and 1 part by weight of PVA were added to the high-speed mixer and mixed for 5 min; the high-speed mixer was heated to 95-100° C., and 0.2 part by weight of itaconic acid was added and mixed for 5 min. Forty parts by weight of PLA resin bounded aggregates were added. The high-speed mixer was heated to 85° C. to mix for 20 min; after discharging, the high-speed mixer was cooled to obtain a degradable masterbatch premix. The premix was compounded and extruded by a two-stage extruder, materials were cooled and pelletized by means of die face pelletizing and air-cooling strand pelletizing processes (to avoid product performance loss due to water absorption during cooling), to obtain palm bio-based/PLA resin masterbatches. At this point, the whole process was completed.

The "part" in the above examples refers to part by weight.

The above descriptions are only preferred examples of the present invention, and these detailed descriptions are different implementations based on the overall concept of the invention; moreover, the scope of the present invention is not limited thereto, and any variations or replacements readily appreciated by those skilled in the art within the technical scope of the present invention disclosed should fall within the extent of protection of the present invention. Therefore, the protection scope of the present invention should be subject to the protection scope defined by the claims.

What is claimed is:

1. A method for preparing a bio-based composite using palm biomass powder as raw material, comprising the following steps:

step 1, palm micropowder washing:
1) placing 100 parts by weight of 600-1,200 mesh palm micropowders in a reactor, adding 400-500 parts by weight of acetone to the reactor in a 1:4 or 1:5 bath ratio, closing the reactor to have a system sealed; heating to 50-60° C., stirring and dispersing for 30 min at 500 rpm, allowing the palm micropowders to stand for sedimentation, slightly compacting solid sedimentates with a pressing plate, withdrawing and recovering supernatant on the pressing plate, recovering acetone solvent by distillation, filtering the remaining turbid solution, and intensively recovering the solvent by distillation; 2) lifting up the pressing plate, adding additional 500 parts by weight of acetone preheated to 50° C. as dispersion medium, stirring and dispersing for 15 min at 500 rpm, allowing the palm micropowders to stand for sedimentation, slightly compacting solid sedimentates with the pressing plate, and withdrawing the supernatant on the pressing plate; and 3) after repeating operations in step 2) 3-4 times, replacing the solvent with cyclohexane and n-octane as dispersion medium so that washing steps are completed;

step 2, surface treatment of palm micropowders
1) heating the reaction system after solvent displacement to 80-100° C., dehydrating distillate with a 3A molecular sieve and then refluxing to the reactor, conducting sampling inspection until water content is below 0.2-0.5 mg/L in the reaction system of the reactor; dissolving 3 or 5 parts by weight of 1,6-diisocyanatohexane or 5 parts by weight of toluene-2,4-diisocyanate in cyclohexane, adding to the reactor, and reflux-reacting for 30 min; 2) dissolving 5 or 8 parts by weight of 1-hexadecanol or 6 parts by weight of 1-octadecanol in heating n-octane, then adding to the reactor, reflux-reacting for 2 h while heating and stirring, adding 3 parts by weight of acetyl chloride to the reaction system, and drying the distillate with a 4A molecular sieve and CaO; after reflux-reacting for 2 h, stopping stirring, and cooling the reaction system down to 50° C.; and 3) slightly compacting palm biomass sedimentates with the pressing plate, withdrawing supernatant, and replacing the solvent with n-pentane; heating and stirring after solvent replacement, vacuumizing, and distilling all liquid phase from the reactor to obtain washed, surface-treated, and strictly dehydrated dry palm biomass micropowders so that surface treatment steps are completed;

step 3, compounding and extrusion of bio-based resin:
1) adding 50-60 parts by weight of the washed and surface-treated palm micropowders into a plastic high-speed mixer with high air tightness and corrosion prevention, holding the high-speed mixer at 70° C., adding 1 part by weight of epoxy soybean oil, or 2 parts by weight of polypropylene wax (PPW) and 1 part by weight of epoxy soybean oil, or 1 part by weight of epoxy soybean oil and 1 part by weight of polyvinyl alcohol (PVA), mixing for 5 min, heating the high-speed mixer to 95-100° C., and mixing with 0.2 part by weight of maleic anhydride or 0.2 part by weight of itaconic acid for 5 min; 2) adding 40 parts by weight of linear low density polyethylene (LLDPE) resin bounded aggregates, 7 parts by weight of 500 mesh calcium carbonate, 3 parts by weight of 1,800 mesh calcium carbonate, and 3 parts by weight of zinc stearate, or 30 parts by weight of polypropylene (PP) resin bounded aggregates, 5 parts by weight of 500 mesh calcium carbonate, 5 parts by weight of 3,000 mesh calcium carbonate, and 3 parts by weight of calcium stearate, or 40 parts by weight of polylactic acid (PLA) resin bounded aggregates; 3) heating the high-speed mixer to 85-90° C., mixing for 20 min, discharging, and cooling to obtain a degradable masterbatch premix; and 4) compounding and extruding the premix with a two-stage extruder, cooling and pelletizing materials by means of die face pelletizing and air-cooling strand pelletizing processes (to avoid product performance loss due to water absorption during cooling), to obtain palm bio-based/polyethylene (PE) resin masterbatches, so that compounding and extrusion steps are completed.

2. The method for preparing a bio-based composite using palm biomass powder as raw material according to claim 1, wherein, in step 1, the palm micropowders are 600, 800, or 1,200 mesh in particle size.

3. The method for preparing a bio-based composite using palm biomass powder as raw material according to claim 1, wherein, in 1) in step 1, heating temperature is 50° C., 55° C., or 60° C.

4. The method for preparing a bio-based composite using palm biomass powder as raw material according to claim 1, wherein, in 1) in step 2, the reaction system is heated at 80° C., 90° C., or 100° C.

5. The method for preparing a bio-based composite using palm biomass powder as raw material according to claim 1, wherein, in 1) in step 2, 3 parts by weight of 1,6-diisocyanatohexane is dissolved in cyclohexane.

6. The method for preparing a bio-based composite using palm biomass powder as raw material according to claim 1, wherein, in 1) in step 2, 5 parts by weight of 1,6-diisocyanatohexane is dissolved in cyclohexane.

7. The method for preparing a bio-based composite using palm biomass powder as raw material according to claim 1, wherein, in 1) in step 2, 5 parts by weight of toluene-2,4-diisocyanate is dissolved in cyclohexane.

8. The method for preparing a bio-based composite using palm biomass powder as raw material according to claim 1, wherein, in 1) in step 3, 50 parts by weight of the washed and surface-treated palm micropowders are added into a plastic high-speed mixer with high air tightness and corrosion prevention.

9. The method for preparing a bio-based composite using palm biomass powder as raw material according to claim 1, wherein, in 1) in step 3, 55 parts by weight of the washed and surface-treated palm micropowders are added into a plastic high-speed mixer with high air tightness and corrosion prevention.

10. The method for preparing a bio-based composite using palm biomass powder as raw material according to claim 1, wherein, in 1) in step 3, 60 parts by weight of the washed and surface-treated palm micropowders are added into a plastic high-speed mixer with high air tightness and corrosion prevention.

* * * * *